SIGNAL COMPRESSION AND EXPANSION SYSTEM

Filed April 5, 1961 3 Sheets-Sheet 1

FIG. I.

INVENTORS:
WILLIAM S. BACHMAN
ABRAHAM A. GOLDBERG
ARTHUR KAISER
BY Brumbaugh, Free, Graves & Donohue
THEIR ATTORNEYS

SIGNAL COMPRESSION AND EXPANSION SYSTEM

Filed April 5, 1961 3 Sheets-Sheet 2

INVENTORS:
WILLIAM S. BACHMAN
ABRAHAM A. GOLDBERG
ARTHUR KAISER
BY
Brumbaugh, Free, Graves & Donohue
THEIR ATTORNEYS

SIGNAL COMPRESSION AND EXPANSION SYSTEM

Filed April 5, 1961 3 Sheets-Sheet 3

INVENTORS:
WILLIAM S. BACHMAN
ABRAHAM A. GOLDBERG
ARTHUR KAISER
BY Brumbaugh, Free, Graves & Donohue
THEIR ATTORNEYS 3,206,556
SIGNAL COMPRESSION AND EXPANSION SYSTEM William S. Bachman, Southport, Abraham A. Goldberg, Stamford, and Arthur Kaiser, Trumbull, Conn., assignors to Columbia Broadcasting System, Inc., New York, N.Y., a corporation of New York Filed Apr. 5, 1961, Ser. No. 100,927
9 Claims. (Cl. 179—100.1)

The present invention relates to sound recording and reproducing systems and, more particularly, to apparatus of this character embodying novel and highly effective compression and expansion means whereby sound reproduction of exceptionally high quality can be achieved.

It is a well-known fact that the dynamic range accommodation of the conventional recording equipment currently being used is considerably less than the dynamic range of certain kinds of program material which are to be recorded. Thus, the concert hall dynamic range of orchestral music may be as great as 80 db, while a master tape recorder can accommodate a dynamic range of about 55 db, and an average phonograph system perhaps no more than 50 db. Accordingly, some form of dynamic range compression in the recording process is desirable. One technique that has been used is to prevent the volume level from rising above a safe maximum, either by manually monitoring the signal level or by means such as a volume limiting amplifier. However, the sound reproduction obtained when this is done is not acceptable to discriminating listeners.

It has also been proposed to compress only signals above a given reference value, all signals of lesser amplitude being uncompressed, and to expand the compressed signals in complementary fashion in the reproducing process so as to restore the original dynamic range to the signal. In general, however, these techniques have not been successful because of the practical difficulties involved in attempting to match the level where expansion begins in the reproducing process to the level where compression begins in the recording process.

It is an object of the invention, accordingly, to provide new and improved sound recording techniques embodying a mode of compression which results in more pleasing and artistically acceptable sound reproduction than has been possible heretofore.

Another object of the invention is to provide new and improved sound reproducing techniques incorporating a mode of expansion enabling compressed program material to be restored substantially to full dynamic range without dependence upon critical sound levels.

A further object of the invention is to provide new and improved sound recording techniques involving novel modes of compression and expansion by means of which records of improved signal-to-noise characteristics may be produced.

Broadly speaking, these and other objects of the invention are attained by subjecting a sound representing signal to be recorded to linear compression over its entire range, the degree of compression being commensurate with the dynamic range that can be accommodated by the recording medium. Linear compression is achieved by supplying the sound representing signal to an adjustable gain device for which the relation between gain in decibels and control voltage is linear and controlling the gain of the device in response to its output, suitably modified to produce the desired linear compression of the original signal. Preferably, modification of the output is effected by function generator means incorporating diode clamps. Linear expansion of a compressed signal is accomplished in a similar manner except that the gain of the adjustable gain device is preferably controlled in response to its input, suitably modified to insure expansion in the linear mode.

The invention also contemplates the provision of records of improved signal-to-noise ratio by subjecting the original signal to linear compression prior to recording on a first medium such as a master tape; subjecting a signal reproduced from the master tape to complementary linear expansion; and recording the expanded signal on a second medium such as a disc record. The latter will have essentially the same dynamic range as conventional records but considerably less of the background noise introduced by the master tape.

For a better understanding of the invention, reference is made to the following detailed description, taken in conjunction with the accompanying drawings, in which.

Figure 1:
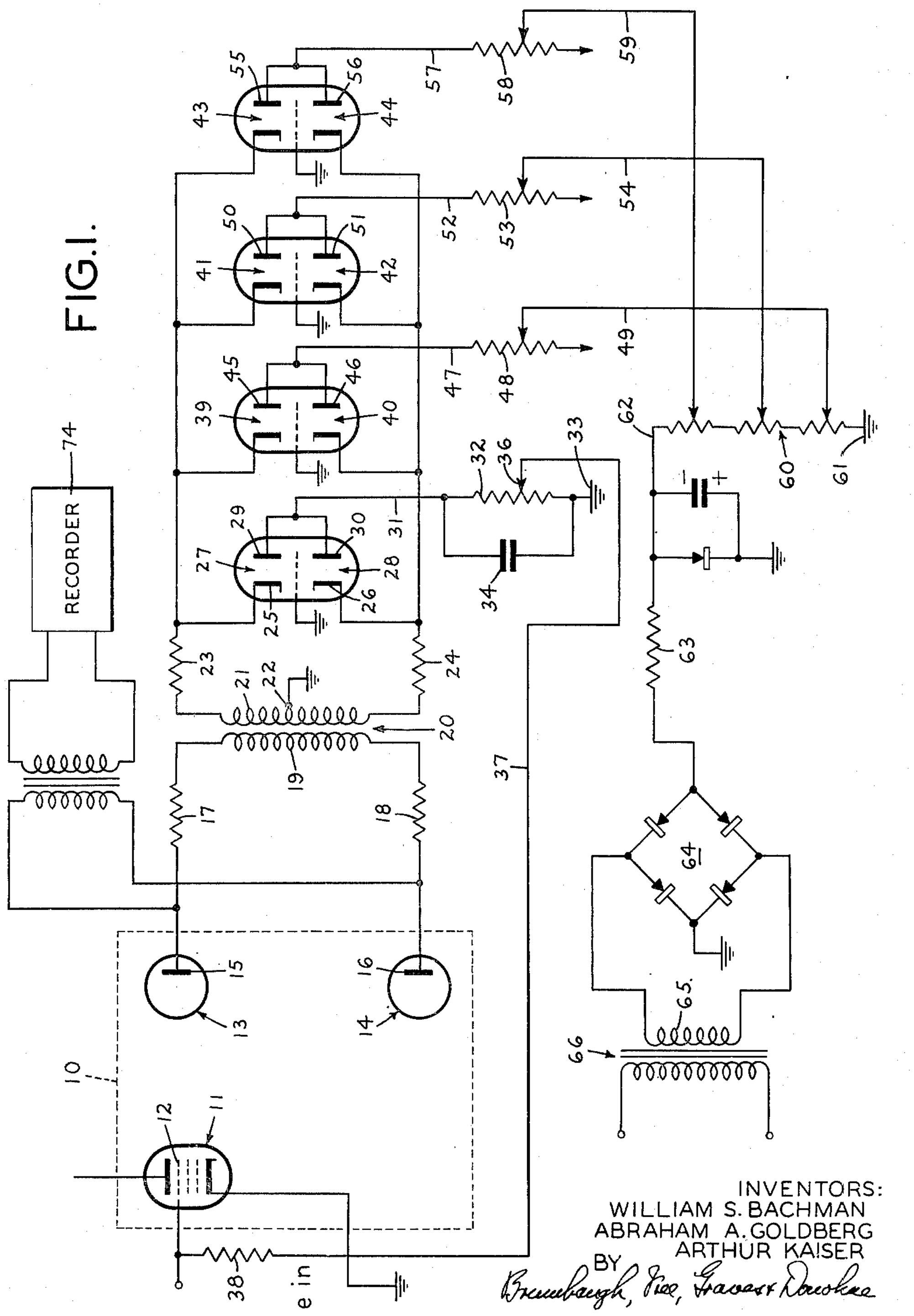
FIG. 1 is a schematic diagram of a compressor system constructed according to the invention.

For effective compression according to the invention, the compressor device should have a characteristic represented by the following expression:

$$e_o = Ke_{in*}\left[\frac{e_{in}}{e_{in*}}\right]^n \quad (1)$$

where $e_{in}$=input signal voltage $e_{in*}$ =reference input signal voltage (e.g., amplifier noise level, recording studio noise level or any arbitrary level above either of these at which compression is zero)

$e_o$=output signal voltage $K$=voltage gain with zero compression ($e_{in}=e_{in*}$)

$n$=compression factor ($<1$)

From Equation 1 it can be shown that $$\frac{e_o}{e_{in}}=G=K\left[\frac{e_{in}}{e_{in*}}\right]^{n-1} \quad (2)$$

where G is the voltage gain corresponding to any value of $e_{in}$.

Combining Equations 1 and 2, it is seen that $$G=K\left[\frac{e_o}{e_{o*}}\right]^{\frac{n-1}{n}} \quad (3)$$

where $e_{o*}=Ke_{in*}$

Equations 2 and 3 indicate how the gain of the device should vary as a function of the input and output voltage, respectively, for effective compression according to the invention.

Expressions (1), (2) and (3) above can be stated more conveniently in decibel form as follows:

$$\log\left[\frac{e_o}{e_{o*}}\right]=n\log\left[\frac{e_{in}}{e_{in*}}\right] \quad (4)$$

$$\log G=\log K+(n-1)\log\left[\frac{e_{in}}{e_{in*}}\right] \quad (5)$$

$$\log G=\log K+\left(\frac{n-1}{n}\right)\log\left[\frac{e_o}{e_{o*}}\right] \quad (6)$$

Identical expressions obtain for expansion except that whereas $n<1$ for compression, for expansion $n>1$. Also, it can be shown that if Equation 1 is used as the basis for both compression and expansion, the expanded output will be a faithful reproduction of the compressed input when the value of $n$ for expansion is made equal to the reciprocal of the value of $n$ used in compression.

It will be apparent from Equations 5 and 6 above that both compression and expansion may be effected by controlling the gain in response to either the input voltage or the output voltage. The latter is preferred, however, and FIG. 1 illustrates a typical compressor according to the invention in which this is done.

Referring to FIG. 1, the compressor comprises a conventional multistage amplifier 10 having an input amplifying tube 11, the control grid 12 of which is adapted to receive the input signal $e_{in}$. The final stage of the amplifier 10 may comprise a pair of output tubes 13 and 14 connected in push-pull in the conventional manner. The gain of the amplifier 10 is adapted to be controlled by the output voltage $e_o$ which appears at the anodes 15 and 16 of the tubes 13 and 14 and is supplied through the resistors 17 and 18 to the primary winding 19 of a transformer 20.

The transformer 20 has a secondary winding 21, the center tap 22 of which is grounded and the ends of which are connected through the resistors 23 and 24 to the cathodes 25 and 26, respectively, of a pair of unilaterally conducting devices 27 and 28. The unilaterally conducting devices 27 and 28 may comprise conventional vacuum diodes in a common envelope such as the type designated 6AL5.

The anodes 29 and 30 of the diodes 27 and 28 are connected together and by a conductor 31 in series with a capacitor 34 which is grounded at 33. The capacitor 34 is shunted by a potentiometer 32 having an adjustable tap 36 connected by a conductor 37 through a resistor 38 to the grid 12 of the input amplifying tube 11. The rectifiers 27 and 28 serve to rectify the output voltage $e_o$ from the amplifier 10 and to supply it as a D.C. bias to the grid circuit of the tube 11 in such fashion as to reduce the gain of the amplifier 10 with increasing signal amplitude and vice versa.

Preferably, the amplifying tube 11 is one which exhibits a linear relationship between decibels of compression and grid bias voltage such as a type 6SK7 remote cut-off pentode. For this tube, the compression is linear and is equal to one decibel per volt of grid bias. In order to obtain the desired compression characteristic in accordance with Equation 6 above, it is necessary that the control voltage supplied to the grid circuit of the input amplifying tube 12 have a predetermined nonlinear relationship with respect to the output voltage from the amplifier 10. The desired nonlinear relationship is secured by connecting in shunt with the diodes 27 and 28 a plurality of pairs of diodes 39, 40, 41, 42, and 43, 44. The anodes 45 and 46 of the diodes 39 and 40 are connected together and by a conductor 47 to an adjustable resistor 48 which is connected by a conductor 49 to a source of negative biasing voltage.

Similarly, the anodes 50 and 51 of the diodes 41 and 42 are connected together and by a conductor 52 through an adjustable reesistance 53 which is connected by a conductor 54 to a different value of negative biasing voltage. Lastly, the anodes 55 and 56 of the diodes 43 and 44 are connected together and through a conductor 57 and an adjustable resistor 58 and conductor 59 to a third value of negative biasing voltage.

The biasing voltages for the pairs of diodes 39, 40, 41, 42 and 43, 44 may be developed across a voltage divider 60 which is grounded at 61 and is connected by a conductor 62 through a resistor 63 to receive the output of a conventional rectifier bridge 64 energized from the secondary winding 65 of a power transformer 66.

For an initial range of the amplifier output $e_o$, only the rectifiers 27 and 28 are conducting and a predetermined relation exists between $e_o$ and the control voltage $E_c$ at the conductor 37. At a certain value of $e_o$, determined by the bias applied to the conductor 49, the rectifiers 39 and 40 begin to conduct and for another range of $e_o$, the slope of the $e_o$–$E_c$ curve has a different value depending upon the setting of the resistor 48. At still higher values of $e_o$, first the rectifiers 41 and 42 and then the rectifiers 43 and 44 become conducting depending upon the different values of bias supplied thereto over the conductors 54 and 59, respectively. For two additional successively higher ranges of $e_o$, therefore, the $e_o$–$E_c$ curve has different slopes depending, respectively, upon the settings of the resistors 53 and 58. Accordingly, by selecting appropriate increasing negative values of bias to be applied to the conductors 49, 54, and 59 and appropriate settings for the resistors 48, 53 and 58, the desired nonlinear function between $e_o$ and $E_c$ can readily be generated.

Figure 2:
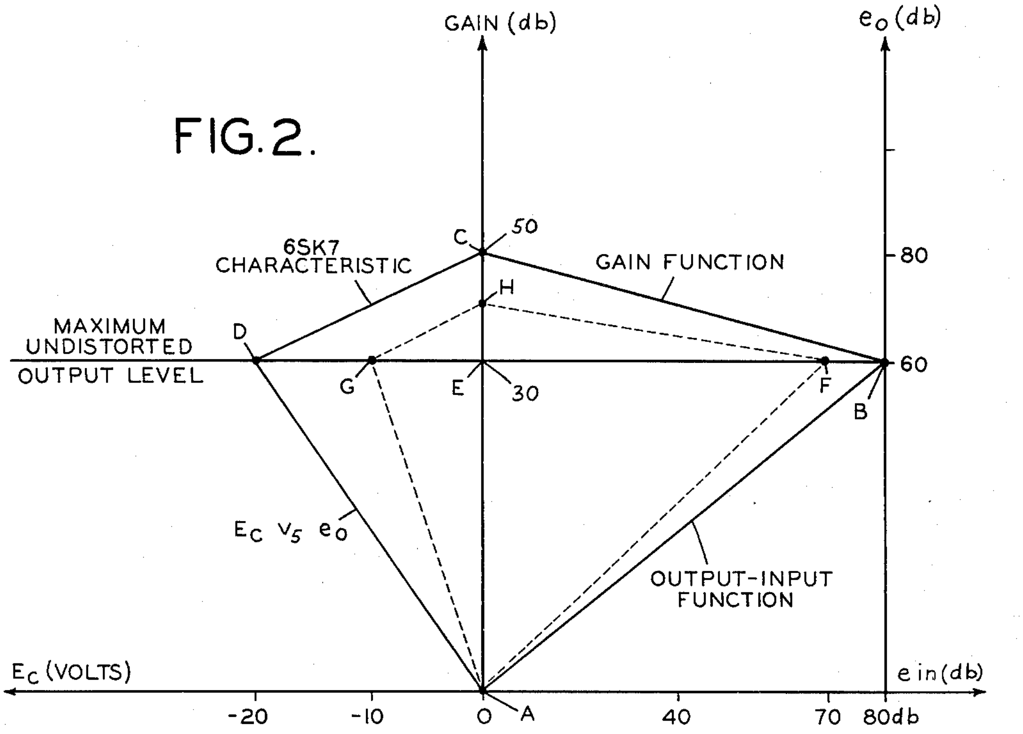
FIG. 2 is a graph showing a group of curves illustrating typical operating conditions in a system of the type shown in FIG. 1.

FIG. 2 represents the four significant functional relationships inherent in a compressor of the type shown in FIG. 1 designed for 20 db compression. In FIG. 2, the line CB indicates the system gain function relative to the amplifier input $e_{in}$; DC represents the compression characteristic of the 6SK7 tube 11 in db per volt; and the line AD indicates the control voltage $E_c$ as a function of output voltage $e_o$ in db which is required to be supplied to the tube 12 over the conductor 37. From this figure, it will be seen that for an output excursion of 60 db represented by the line AE, a 20 volt excursion of grid bias supplied to the tube 12 is required for 20 db compression. If, instead of using the full 20 volt bias excursion, the voltage divider 36 is adjusted to provide some other value of bias excursion, say 10 volts, the total compression will be 10 db, the four functional relationships for this case being expressed by the polygon AGHF in FIG. 2. Actually, full adjustment of the slope of the compression characteristic can be effected by adjustment of the voltage divider 36.

Figure 3A:
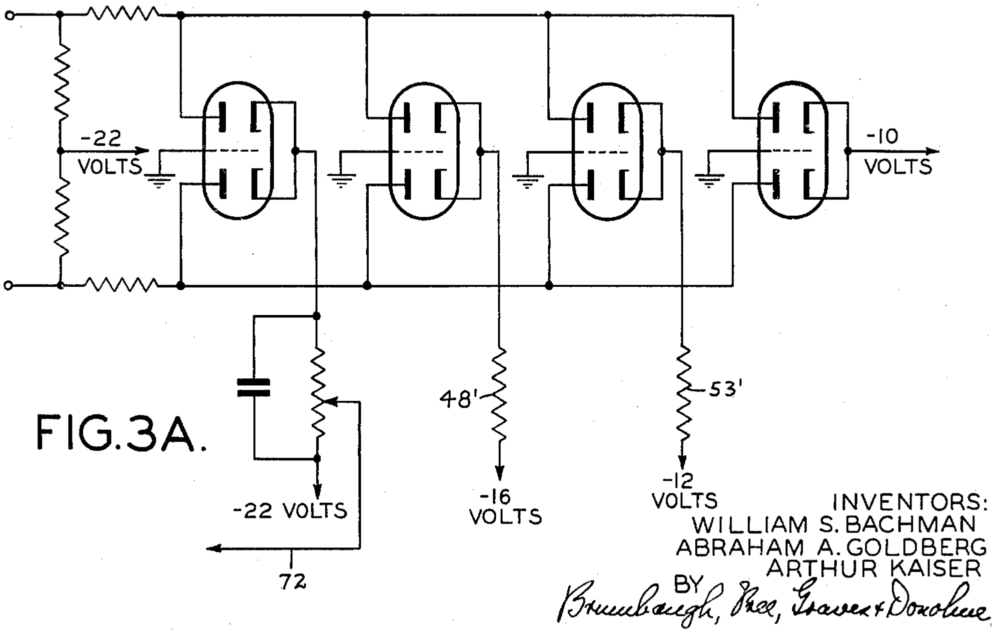
FIG. 3A shows in schematic form a rectifier and function generator that is used in the system of FIG. 3.
Figures 3, 4:
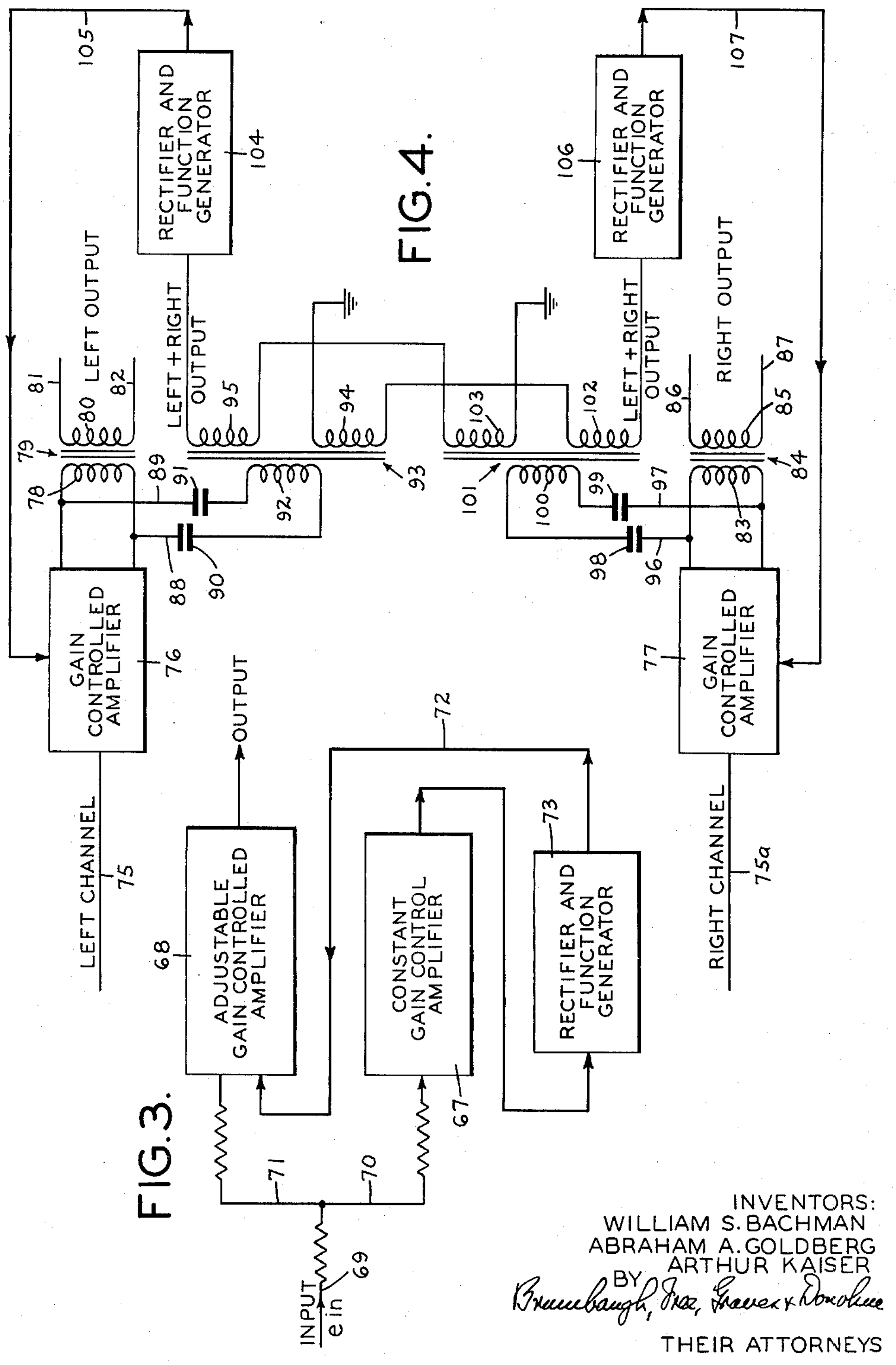
FIG. 3 illustrates schematically an expansion system in accordance with the invention.
FIG. 4 is a schematic diagram of a stereophonic sound recording system embodying the invention.

In FIG. 3 is shown a typical expander embodying the invention. It comprises a control amplifier 67 of constant gain and a controlled amplifier 68 of adjustable gain, both connected to receive an input signal over the conductors 69, 70 and 71. The amplifier 68 may be similar to the amplifier 10 in FIG. 1 and may have a type 6SK7 tube in an input stage thereof, the control grid of which is adapted to be biased by a control signal received over a conductor 72 from a rectifier and function generator 73 connected to receive the output of the control amplifier 67.

The rectifier and function generator 73 may be similar to the corresponding components in the compressor shown in FIG. 1 except that the diodes are poled oppositely and biased so that they are all nonconducting when the input is zero, as shown in FIG. 3A. The biases for the several pairs of diodes are selected so that they become conducting, respectively, at successively greater input signal values, and reduce the initial bias applied to the input of the amplifier 68. Also, the values of the load resistors 48' and 53' are selected to give the correct nonlinear relation between the output of the amplifier 68 and the control voltage at the conductor 72 to satisfy Equation 6 above with an expansion exponent that is the reciprocal of the compression exponent used in the compressor of FIG. 1.

If the output of the compressor shown in FIG. 1 is fed to a recorder 74 capable of making a disc or tape record, for example, and the signal produced when the record is reproduced is fed to an expander of the type shown in FIG. 3, the program material will be restored substantially to full dynamic range in a manner that is more pleasing and more acceptable than has been possible heretofore. With regard to transient response, the total system gain is constant during recovery after a signal of very high level so that the expander output will faithfully reproduce the compressor input.

A compressor-expander system of the type described above affords an opportunity for effecting a substantial improvement in overall signal-to-noise ratio in recording techniques in which program material is first recorded on one medium such as a master tape from which a recording on another medium (e.g., a disc record is made). One problem encountered in making such records according to the conventional practice is that the master tape introduces hiss which is sometimes audible when a disc record made from the tape is played. If a signal representing program material is first compressed in a linear compressor of the type shown in FIG. 1, prior to recording on a master tape, and the signal derived from the tape is expanded in a compensatory expander of the type shown in FIG. 3 before making the disc record, the tape hiss can be made inaudible in the latter.

For example, assume that an 80 db range signal from a microphone is supplied to a compressor of the type shown in FIG. 1 having a compression exponent $n=3/8$. The compressed signal, which now has a total dynamic range of 30 db, is fed to a master tape recorder where it is recorded. Since master tape recorders of the type currently in use have signal-to-noise ratios of the order of 50 db, a minimum level signal-to-noise ratio of 20 db is available at the expander input. Upon playback of the master tape, the reproduced signal is expanded to a range of say, 50 db in an expander of the type shown in FIG. 3 having an expansion exponent of 5/3 and the expanded signal is recorded on a disc record. For a 40 db difference between two successive signal levels, a 25 db gain recovery is involved at the compressor and a 10 db gain at the expander. Hence, the net audible recovery would be an increase of 15 db.

By way of comparison, if a compressor having a compression exponent $n=5/8$ had been used, a 20 db signal-to-noise improvement would have been sacrificed. Thereafter, if a playback expander having an expansion exponent $n=8/5$ were to be used to reproduce the record, no significant gain recovery change would be evident.

FIG. 4 illustrates a typical stereophonic two-channel compressor embodying the invention. "Left" and "Right" input signals are supplied over the conductors 75 and 75*a* to a pair of gain controlled amplifiers 76 and 77. The output of the amplifier 76 is fed to the primary winding 78 of a transformer 79 having a secondary winding 80 which supplies a compressed "Left" output to the conductors 81 and 82. Similarly, the output of the amplifier 77 is fed to the primary winding 83 of a transformer 84 having a secondary winding 85 which supplies a compressed "Right" output to the conductors 86 and 87.

In order to maintain stereophonic separation, it is important that the compression be identical in the two channels. Also, the compression should relate to the total acoustic level of the two channels rather than to the level of any one channel alone. To this end, the output of the amplifier 76 is also fed through the conductors 88 and 89 and the condensers 90 and 91 to the primary winding 92 of a transformer 93 having two secondary windings 94 and 95. Similarly, the output of the amplifier 77 is also fed through the conductors 96 and 97 and the condensers 98 and 99 to the primary winding 100 of a transformer 101 having two secondary windings 102 and 103.

The secondary windings 95 and 103 are connected in series aiding to provide a signal representing the sum of the "Left" and "Right" signal outputs from the amplifiers 76 and 77. This sum signal is fed to a rectifier and function generator device 104 which provides D.C. bias over the conductor 105 to control the gain of the amplifier 76 in the manner described above so as to cause linear compression of the signal transmitted over the "Left" channel. In similar fashion, the transformer secondary windings 94 and 102 are connected in series aiding to provide a second sum signal which is fed to a second rectifier and function generator device 106. The latter supplies a D.C. biasing signal over the conductor 107 to control the gain of the amplifier 77 as required to produce linear compression in the "Right" signal channel.

The invention thus provides novel and highly effective means for compressing and expanding information representing signals. Sound reproduced from a recording subjected to compression in the above fashion, even without expansion, is more pleasing and more acceptable artistically than sound reproduced from a recording made according to techniques embodying either manual monitoring or a limiting amplifier to restrict the dynamic range of the original signal. Moreover, by subjecting the reproduced signal to linear expansion in a manner complementary to the compression effected in recording, substantially the entire dynamic range can be restored without dependence in any way upon critical signal levels. The resultant sound reproduction, after linear expansion, is of superior quality and acceptable to the most discriminating of listeners.

The several specific embodiments described above are obviously susceptible of modification in form and detail within the scope of the invention. Thus, the degree of compression or expansion may be controlled in response to the input signal instead of the output signal. Also, in any compression expansion system according to the invention, it is not necessary that the compressor and the expander both be linear mode devices provided that the net result is linear. Further, expansion may be controlled in response to a separate pilot signal varying with signal amplitude instead of the signal itself. The invention, therefore, is intended to embrace all such modifications as come within the scope of the following claims.

We claim:

1. A signal recording and reproducing system comprising means for linearly compressing said signal over substantially the entire dynamic range of the signal to reduce the dynamic range thereof, means for recording the compressed signal on a medium, means for reproducing the signal recorded on said medium, and means for linearly expanding the reproduced signal in a manner complementary to the signal compressing to render the net gain in compression and expansion constant during the recovery after occurrence of a high level signal, each of said compressing and expanding means including a signal transmission channel means incorporating bias responsive gain adjusting means, said gain adjusting means having a linear relation between bias volts and gain in decibels over substantially the entire dynamic range of the signal transmission channel means, means connected to said transmission channel for rectifying a signal therein, means connected to said rectifying means for modifying the rectified signal output thereof to produce a biasing signal for modifying the gain in decibels of said signal transmission channel means linearly as a function of the signal in decibels in said transmission channel, and means for supplying said modified rectified signal to said gain adjusting gains.

2. Apparatus for providing a linear relationship between gain in decibels and signal level in decibels in a signal transmission channel, whereby a linear characteristic of input in decibels versus output in decibels for said channel is obtained, comprising gain adjusting means for said channel having a linear relationship between control voltage in volts and gain in decibels over substantially the entire dynamic range of said signal transmission channel, means coupled to said channel and responsive to the signal therein for developing a non-linear control voltage having values which in conjunction with said control voltage versus gain relationship of said gain adjusting means will provide said linear gain versus signal level relationship for said channel, and means coupling the output of said control voltage developing means to said gain adjusting means.

3. Apparatus for providing a linear relationship between gain in decibels and signal level in decibels in a signal transmission channel, whereby a linear characteristic of input in decibels versus output in decibels for said channel is obtained, comprising gain adjusting means for said channel having a linear relationship between control voltage in volts and gain in decibels over substantially the entire dynamic range of said signal transmission channel, means coupled to said channel for rectifying a signal therein, voltage modifying means coupled to said rectifying means to provide a control voltage, and means coupling said control voltage to said gain adjusting means, said voltage modifying means providing a non-linear control voltage having values to obtain said linear gain versus signal level relationship.

4. Apparatus according to claim 3, wherein said voltage modifying means is connected in shunt with said rectifying means, whereby said control voltage is developed at the output of said rectifying means.

5. Apparatus according to claim 3 wherein said voltage modifying means comprises a function generator.

6. Apparatus for providing a linear relationship between gain in decibels and signal level in decibels in a signal transmission channel, whereby a linear characteristic of input in decibels versus output in decibels for said channel is obtained, comprising gain adjusting means for said channel having a linear relationship between bias in volts and gain in decibels over substantially the entire dynamic range of said signal transmission channel, means connected to said transmission channel for rectifying the signal output thereof, a plurality of unilaterally conductive devices connected in shunt with said rectifying means, means supplying different bias values to said unilaterally conductive devices, a plurality of different electrical load impedances for said respective unilaterally conductive devices, and means coupling at least a portion of the voltage developed by said rectifying means to said gain adjusting means to provide a bias therefor, said bias values and load impedances for said unilaterally conductive devices being selected to provide a bias for said gain adjusting means for obtaining said linear gain versus signal level characteristic.

7. Apparatus for providing a linear relationship between gain in decibels and signal level in decibels in a signal transmission channel, whereby a linear characteristic of input in decibels versus output in decibels for said channel is obtained, comprising adjustable gain amplifying means for said channel having a linear relationship between control voltage in volts and gain in decibels over substantially the entire dynamic range of said signal transmission channel, constant gain amplifying means connected to receive a portion of the input signal to said channel, means for rectifying the output of said constant gain amplifying means, voltage modifying means coupled to said rectifier to provide a control voltage, and means coupling said control voltage to said adjustable gain amplifying means, said voltage modifying means providing a non-linear control voltage having values to obtain said linear gain versus signal level relationship.

8. Apparatus according to claim 7, wherein the gain in decibels of said adjustable gain amplifying means increases linearly with an increase in the output signal in decibels of said constant gain amplifying means.

9. Apparatus for providing a linear relationship between gain in decibels and signal level in decibels in each of a pair of related signal transmission channels, whereby a linear characteristic of input in decibels versus output in decibels for each channel is obtained, comprising gain adjusting means for each of said channels having a linear relationship between control voltage in volts and gain in decibels over substantially the entire dynamic range of said respective channel, means for each channel responsive to the sum of the outputs of both said channels to provide a control voltage for its associated gain adjusting means, and means coupling said control voltages to the respective gain adjusting means in said channels, said control voltages having values to obtain said linear gain versus signal level relationships in said channels.

References Cited by the Examiner

UNITED STATES PATENTS

| | | | |
|---|---|---|---|
| 1,998,620 | 4/35 | Hammond | 179—100.1 |
| 2,065,489 | 12/36 | Etzrodt | 333—14 |
| 2,458,641 | 1/49 | Rettinger et al. | 179—100.1 |
| 2,585,890 | 2/52 | Wolfe | 330—138 |
| 2,697,201 | 12/54 | Harder | 333—14 |
| 2,747,028 | 5/56 | Clark | 330—138 |
| 2,760,008 | 8/56 | Schade | 330—138 |
| 2,763,838 | 9/56 | McConnell | 330—69 |
| 2,768,352 | 10/56 | Von Sivers et al. | 333—14 |
| 2,866,015 | 12/58 | Sailor | 330—138 |
| 2,920,291 | 1/60 | Brundage | 333—14 |

FOREIGN PATENTS

| | | |
|---|---|---|
| 448,334 | 5/48 | Canada. |
| 844,925 | 7/52 | Great Britain. |

OTHER REFERENCES

Langford et al.: Radiotron Designer's Handbook, RCA 4th ed., 1952, pp. 684, 688–692 relied on.

Mathes et al.: "Compandor," Electrical Engineering, June 1934, pp. 860–866 relied upon.

ELI LIEBERMAN, *Acting Primary Examiner.*

STEPHEN W. CAPELLI, HERMAN K. SAALBACH, *Examiners.*

UNITED STATES PATENT OFFICE

CERTIFICATE OF CORRECTION

Patent No. 3,206,556 September 14, 1965

William S. Bachman et al.

It is hereby certified that error appears in the above numbered patent requiring correction and that the said Letters Patent should read as corrected below.

Column 8, line 42, for "Great Britain" read -- Germany --.

Signed and sealed this 17th day of January 1967.

(SEAL)

Attest:

ERNEST W. SWIDER
Attesting Officer

EDWARD J. BRENNER
Commissioner of Patents